July 5, 1927. 1,634,534
A. R. BREWER
MACHINE TOOL
Filed Sept. 15, 1924 6 Sheets-Sheet 1
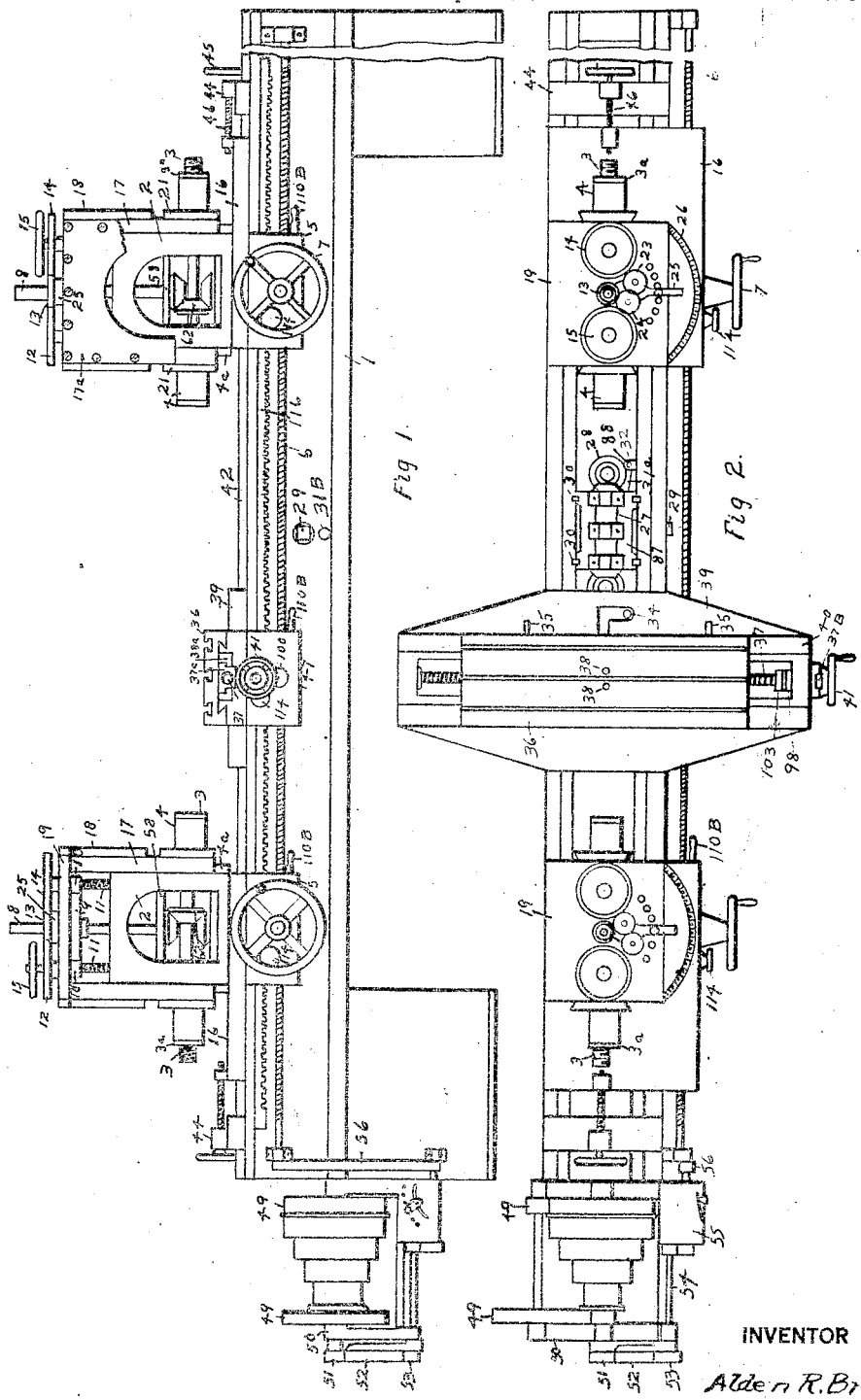
INVENTOR
Alden R. Brewer
Clarence A. O'Brien
atty.

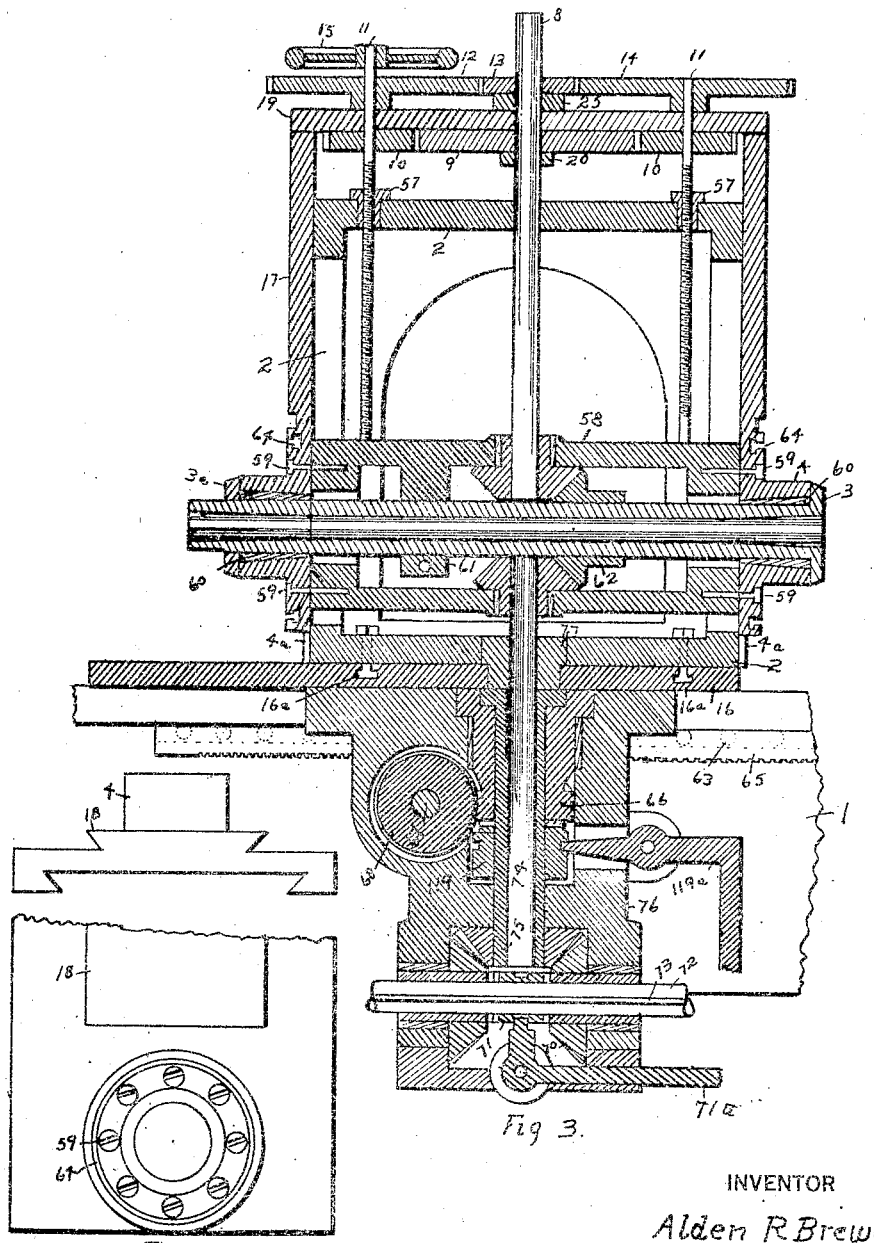

July 5, 1927.
A. R. BREWER
1,634,534
MACHINE TOOL
Filed Sept. 15. 1924
6 Sheets-Sheet 4
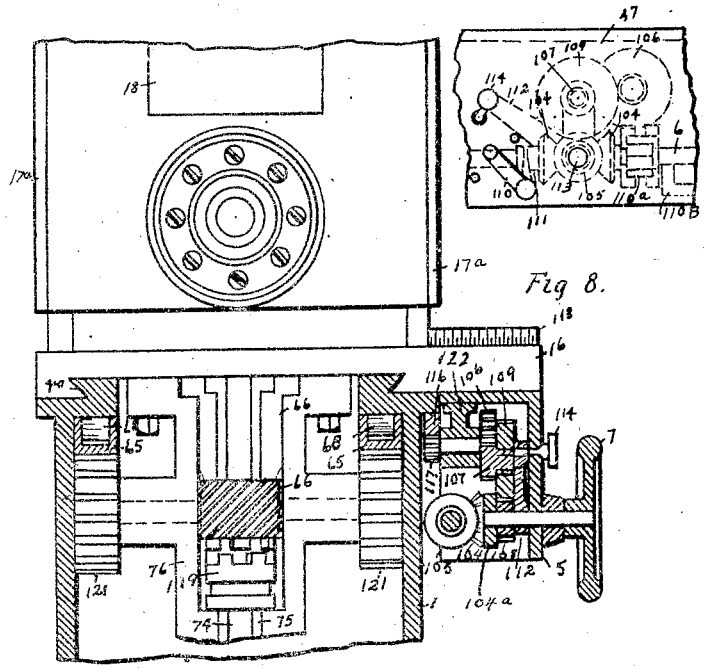
Fig 8.
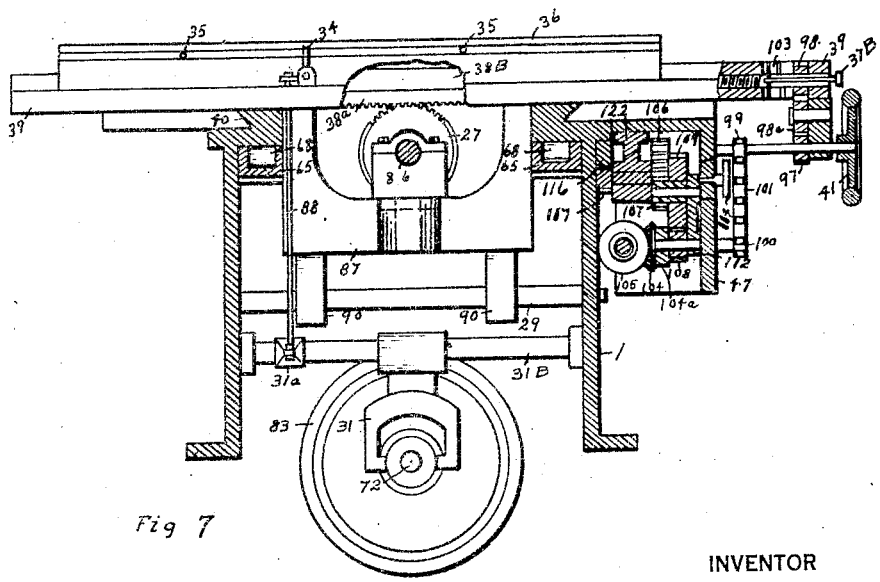
Fig. 9.
Fig 7
INVENTOR
Alden R. Brewer
Clarence A. O'Brien
Atty.

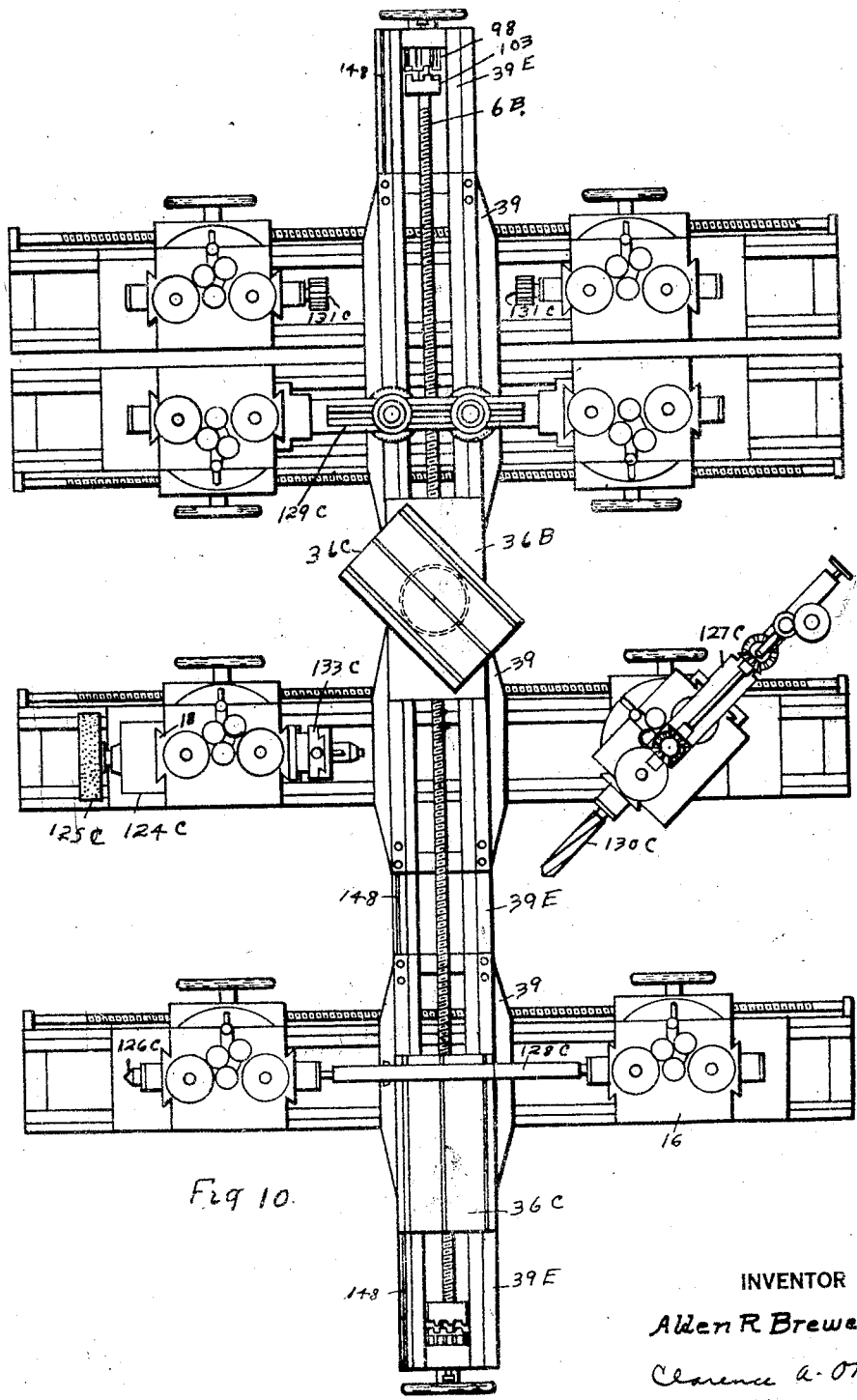

July 5, 1927. 1,634,534
A. R. BREWER
MACHINE TOOL
Filed Sept. 15, 1924 6 Sheets-Sheet 6
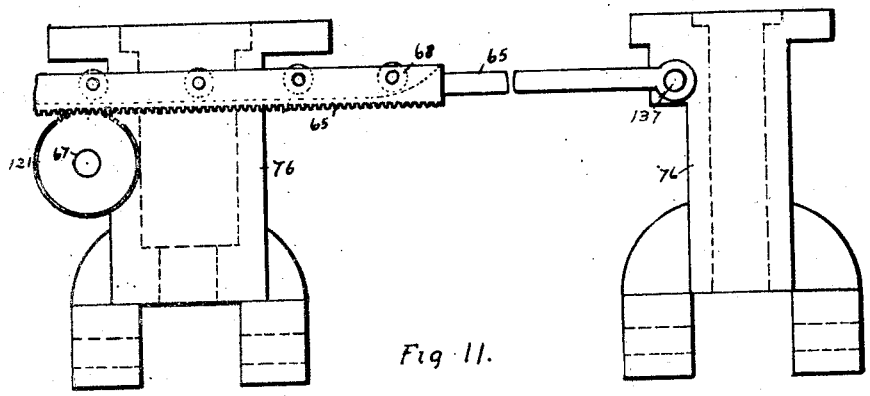
Fig. 11.
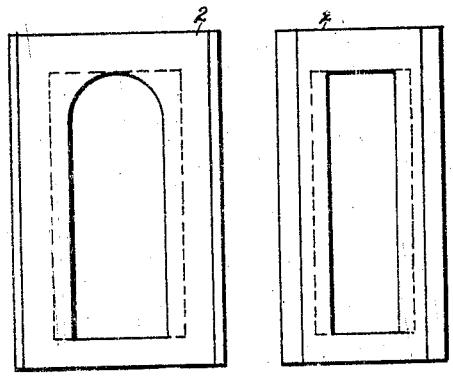
Fig. 13. Fig. 14.
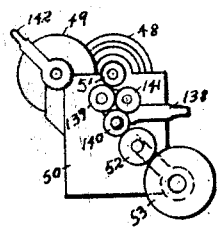
Fig. 15.
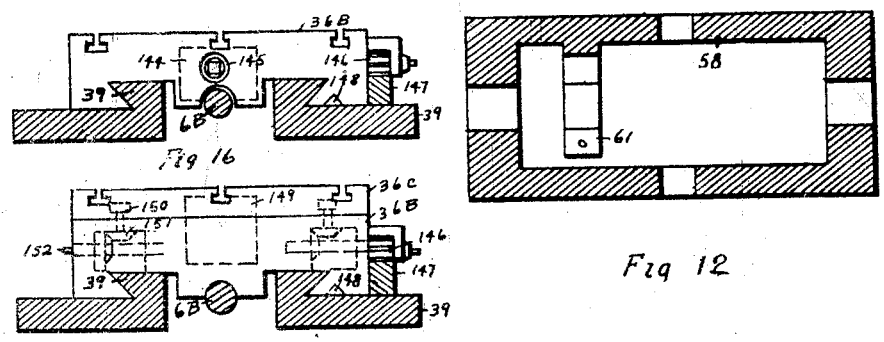
Fig. 16.
Fig. 17.
Fig. 12.
INVENTOR
Alden R. Brewer.
Clarence A. O'Brien
atty.

Patented July 5, 1927.

1,634,534

UNITED STATES PATENT OFFICE.

ALDEN R. BREWER, OF SPOKANE, WASHINGTON.

MACHINE TOOL.

Application filed September 15, 1924. Serial No. 737,730.

The invention relates to metal working machines. Its objects are to provide a machine that is a pioneer in its class and basic in its purpose and combination, complete and independent within itself. It is capable of independent and complete production of its own kind, or of independent and complete production of any other kind usually accomplished in the art to which this machine belongs. Another object is to provide a mechanical combination that is capable of performing a plurality of machining operations with a single setting of the work and be capable of performing all the usual machining operations simultaneously. It is adapted for assembling in series of two or more units in symmetrical order, whereby multiple machining operations may be performed in continuous progression in a straight line feed traversing the series. It has adjustments adapting it conveniently to work of all sizes and shapes, thus covering the entire manufacturing and machine shop practice and standing alone in its class.

In disclosing this invention I do not wish to be limited to the exact detail of construction as I have used to illustrate the principles of the organization of the invention. With these and other objects in view, the invention consists of the novel features of construction as hereinafter shown and described, and then pointed out in the claims.

One embodiment of the invention is represented in the drawings forming a part of this specification in which similar characters of references indicate corresponding parts in all the views.

In the drawings:

Fig. 1, is a front elevation of the machine embodying the invention.

Fig. 2, is a plan view of the same.

Fig. 3, is a longitudinal sectional view of one of the head stocks.

Fig. 4, is a front view of one of the saddle members of one of the head stocks, partly broken away, and its plan view projected.

Fig. 7, is a sectional view of one of the aprons controlling work tables.

Fig. 8, is a detail view of the mechanism of the aprons.

Fig. 9, is a sectional view showing part of the shaper drive mechanism, and one of the aprons controlling one of the head stocks.

Fig. 10, is a plan view showing a series of units arranged in symmetrical order whereby multiple operations may be performed in continuous feed progression in a straight line.

Fig. 11, is a side view of the head stock brackets, and rack drive of the shaper motion.

Fig. 12, is a sectional view of one of the members of the head stock saddles.

Fig. 13, is a side elevation of one of the standards.

Fig. 14, is a front elevation of one of the standards.

Fig. 15, is an end view of the change gears controlling the lead screw.

Fig. 16, is an end view of one of the work tables used with the continuous feed system.

Fig. 17, is an end view of a swiveled work table.

Figure 6:
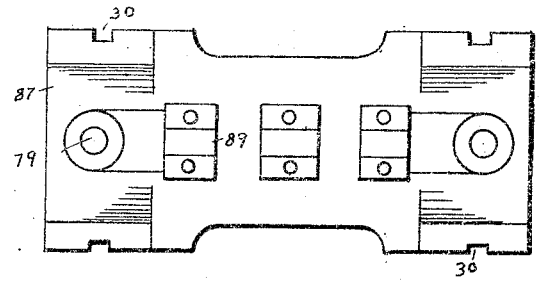
Fig. 6, is a plan view of the elevating member of the planer drive.

The machine is provided with a suitable bed 1 having dove tail ways 42 on its upper side and running its full length. On said bed are mounted a number of saddles 16, usually two in connection with one work table or three may be used in connection with two work tables. This last arrangement converts the machine into a double machine, whereby different machine operations may be performed simultaneously. One or more tail stocks may also be mounted on the bed in connection with the work heads. Cylinder grinding heads may be mounted on the bed and driven direct from one of the work spindles carried by the work heads. In this case the cylinder to be ground is mounted on an angle plate on the work table. Said work tables are mounted on carriages 39 having traversing ways 40. All of said saddles and carriages are provided with aprons 5 and 47. Said aprons containing suitable mechanism communicating with lead screw 6 for power control, and having hand wheels 7 and 41 for manual control. On each of the saddles 16 are mounted rotatable work heads. In the construction of the work heads are embodied standards 2, having a double set of vertical dovetail ways 4ª on opposite sides of said standards. On said vertical ways are mounted telescoping saddles. Said saddles embody members 17, 18, 19 and 58. Said saddle members 17 are supported on opposite sides of said standards on said vertical ways 4ª. They are connected by members 58, which pass through the centers of said standards. Said members 17 are also connected on opposite sides of said standards by members 17ª, thus forming the saddles into telescopes over the standards. Members 17 are provided with cylindrical projections 4. These projections support adjustable taper bushings 60 which form bearings for double ended work spindles 3. Surrounding said projections 4 are annular T-bolt races 64. Said races are for the purpose of bolting attachments supported by said projections 4. Said attachments may be driven from said work spindles 3 or from the vertical shafts 8 or from the main drive shafts 72 or from spur gear 85.

Attachments may also be supported on vertical ways 18, and operated from work spindles 3 or from the vertical shafts 8. The work spindles are hollow, and constructed with double ends, and have standard taper holes for use with lathe centers, drills, reamers, end mills, slabs mills, plain and other form of milling cutters, arbors, boring bars, draw-in collets, feeding fingers, special chucks, and for holding special bushings when acting as outbearings for long boring bars. One end of said work spindles is provided with standard threads for receiving various kinds of chucks, face plates, traverse heads, etc. Standards 2 supporting the telescoping saddles and work spindles are turreted around bushings 77. These bushings are rigidly connected to saddles 16. Provision is made for locking the work heads and work spindles parallel or at any horizontal angle with the bed or work tables by the annular T-bolt races 16ª. The saddles and work spindles are lowered or elevated by means of twin screws 11 and nuts 57. Said nuts 57 are positioned in the tops of standards 2. The twin screws 11 are operatively connected by gears 10 and idler gears 9. Gears 9 are loosely mounted on vertical shafts 8, and held in place by collars 20. Said twin screws are attached to saddle members 56. These twin screws may be operated by hand wheels 15, or they may be operated by power through change gears 12, 13 and 14. Said twin screws are reversed in direction by shifting lever 25, bringing either gears 13 or 23 into engagement with gears 12 or 14. Change gears 12 and 14 and hand wheels 15 are splined keyed to the twin screws. When said gears 12 and 14 are replaced with gears of a different size, a variable rate of feed is provided for the vertical movement of the saddles and work spindles. Threaded collars 3ª are provided on one end of the work spindles. Spindle locks 61 are provided.

Brackets 76 are attached to the under sides of saddles 16. Said brackets support the vertical shafts 74 which communicate motion to the work spindles through bevel gears 62. Said shafts 74 are splined keyed to the inner sides of hollow shafts 75, and telescoping therewith providing for vertical adjustments of the work spindles. Said hollow shafts are driven by clutch reversing gears 70 and 71 which are splined keyed to the main drive shaft 72. Said main drive shaft is splined keyed its full length. On the hollow shafts 75 are loosely mounted spiral gears 66 which engages a spiral gear keyed to shaft 67 which imparts motion to gears 121 and racks 65. One end of said racks is connected to one of the brackets 76 by a pin 137 which imparts reciprocating motion to one of the work heads for shaping or key seating work when held on the work table or in chuck on the opposite spindle. Said reciprocating motion is controlled by clutch 119, clutch fork 119ª, clutch reversing gears 70, 71 and clutch fork 71ª.

The lead screw 6 extends the full length of the bed and communicates with the mechanism of all the aprons controlling the work heads and work table movements. Said mechanism is also arranged for hand control. In all the aprons I have shown the same type of mechanism; various equivalents may be employed. In the construction shown 111 is a sleeve splined keyed to the lead screw 6. Upon said sleeve are keyed two bevel pinions 105. The sleeves extend at one end and contain grooves communicating with clutch forks which are operated by levers 110. Said levers are held in position by spring pins in properly located holes in the outside walls of the aprons. When said spring pins are entered in the center holes the mechanism is neutral with the lead screw 6. When the lever is moved to the right or left, it causes the clutch fork to move gears 105 into engagement with gears 104, causing it to revolve either to the right or to the left as desired.

Gears 104 and 108 are keyed to shafts journaled to the outside walls of the aprons and to the inside walls at 104ª. Gears 107 and 109 are made integral and are loosely rotated upon a pin or stud set rigid into a rocker bar 112. Said rocker bar is loosely journaled upon a shaft supporting gears 108. Gears 107 and 109 are driven by gears 108. Gears 107 may be thrown into or out of engagement with gears 106 by withdrawing spring pin 114 and raising or lowering rocker bar 112. Gears 106 communicate motion through shafts journaled in inside walls 122 to rack pinions 117 which engage rack 116, thus giving longitudinal movements to the work heads and work tables. Also the reverse movements are provided for by the operation of levers 110 and 112.

For thread cutting, longitudinal movements of the work tables and work heads are provided for by split nuts 110ᵃ and levers 110ᴮ. On the outside of the aprons controlling the work tables, are sprockets which transmit motion through chain to sprocket 99 through shafts to hand wheels 41. The motion is further transmitted to the cross feed screw controlling the work tables 36 through gears 97, idler gears 98ᵃ to gear 98. Said gears 98 are made integral with one of the clutch members 103 which is loosely journaled on said cross feed screw. One of the clutch members 103 is splined keyed to the cross feed screw. It is actuated by a cross pin in an elongated slot in the feed screw. The end of said cross feed screw is hollow for a distance; said hollow end is occupied by a push-in pin which actuates one of the members of the clutch 103; said push-in pin terminates in a knob 37ᴮ at its outer end. The holow end of the cross feed screw and the push-in pin 37ᴮ is extended. Said extended end of the cross feed screw has mounted thereon index collars and hand wheel not shown in the drawings. The work tables 36 are provided with rack drives which are employed when the tables are used for planing, grinding, etc., or when a rapid reciprocating motion is required.

Figure 5:
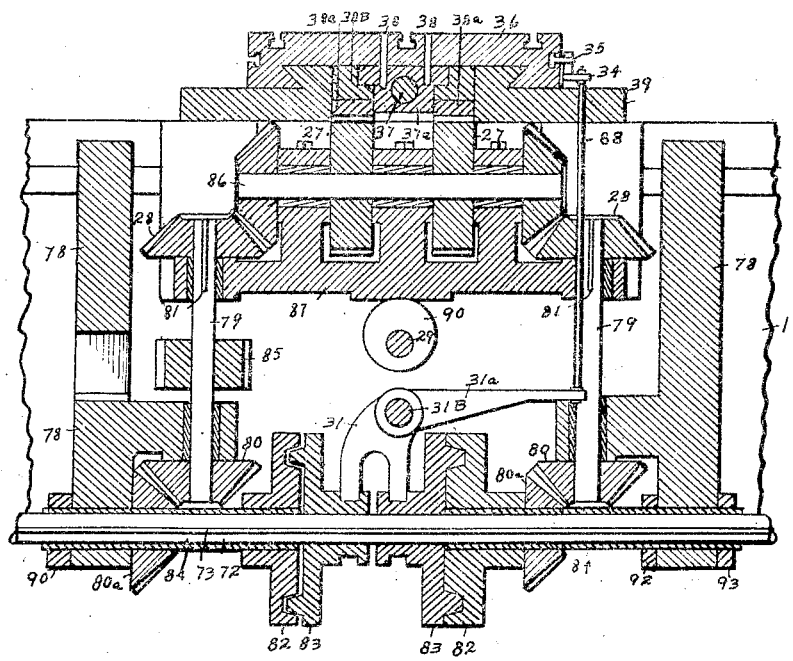
Fig. 5, is a sectional view of the planer drive mechanism.

This reciprocating motion is accomplished by mechanism located in the center of the bed represented in Fig. 5. In the construction shown the cross feed screw nuts 37ᵃ are detachably connected to the work tables 36 by draw-out pins 38. Said nuts 37ᵃ are thus freed to slide in the guides 38ᴮ which run the full length of the work tables and are attached rigidly thereto. Racks 38ᵃ are attached to said guides and communicate with spur gears 27. Said spur gears are keyed to shaft 86 which is supported by a vertical guiding member 87, and controlled by cams 90. Said cams are keyed to shaft 29 which is actuated by a hand crank on the outside of the bed. A turn of the cams 90 throws the spur gears 27 into or out of engagement with racks 38ᵃ. Bevel gears 28 are spline keyed to vertical shafts 79 as shown at 81. Bevel gears 80ᵃ and the clutch members 82 are keyed to sleeves 84. These sleeves are loosely mounted on the main drive shaft 72. The clutch members 83 are splined keyed to the main drive shaft.

Reciprocating motion of the work table 36 is automatically controlled through the action of stop pins 35, rocker bar 34, connecting rod 88, clutch lever 31ᵃ, clutch fork 31 and clutch member 83. The work head saddles may be locked against longitudinal movements by any well known means. One method which I have illustrated shows a saddle 44 which may be locked to the ways of the bed and a connection made by a screw 46 to the workhead saddle 16 and having a hand wheel 45.

The main drive shaft may be rotated by any well known means. In the drawings I have shown a belt step drive pulley, with simple back speed reducing gears. When a belt drive of this kind is used, the main drive shaft 72 extends through the drive pulley 70 which is rotatably mounted thereon. The first large drive gear and the spindle gear 51 is keyed to the drive shaft. In the drawings I have shown loose change gears 52 and 53 and a stud gear 140. Also there is the usual rocker bar lever 138 with its reverse gears 139 and 141. The back gears 49 are mounted on a sleeve rotatable on a cam shaft which is controlled by a lever 142. A bracket 50 is attached to one end of the bed for the purpose of supporting said change gears and drive mechanism of the main drive shaft Quick change gears may be located as shown at 55. Motion may be transmitted to the main lead screw 6 through sprocket chain 56.

In Fig. 10, I have shown a system comprising a number of unit machines arranged for continuous feed in a straight line. In manufacturing where multiple production is required on duplicate parts any number of units may be used. The system is applicable to a single unit, or to two or more units. The system is also equally applicable in duplicate or triplicate circuits of continuous feed by the employment of three or more work heads and two or more work tables to each unit. Any number of units may be set at any convenient distance from one another, with work tables in line with one another, and connections made between the carriages of the work tables, to form a continuous path for the work tables across all the units. When the invention is thus used for continuous straight line feed the short cross feed screws 37 are replaced by a long cross feed screw 6ᴮ. Said long cross feed screw 6ᴮ extends across all the units and may be driven from either end, or from both ends by power transmitted through lead screws 6 and aprons 47. Duplicate work of any width or of any height may be passed in continuous progression across any number of units receiving a plurality of machining operatio s, resulting in the complete transformation from the raw material to the finished product. The organization of the machine is such as to provide an adaption of any kind of cutting tools. In the multiple unit system, when such machining operations as boring, drilling, planing and shaping is done, the work tables may be detached from the long feed screw, leaving the screw in service for such work as milling, grinding, etc, on the other units of the system. This is accomplished by the use of special work tables shown in Fig. 16, and Fig. 17. In Fig. 16, 144 is a half-nut communicating with the long cross feed screw 6ᴮ. This half-nut is thrown into or out of engagement with said feed screw by means of the cam 145. Said work tables may be moved from one unit to another or adjusted to any position at any unit by means of the rack 147 and gear 146. Said rack 147 is attached to each of the work table carriages 39 and also to each of the connections and extensions 39ᴮ and it runs the full length of the feed system across all the units. The rack engaging gears 146 are attached to each of the work tables and are arranged to be turned by hand whereby any work table may be moved from one unit to another or adjusted to any position at any unit. Turreted subwork tables are used as shown at 36ᶜ when it is desired to accomplish machining all sides of the work without resetting the work. These subtables are turreted around the point 149 and have an annular T-bolt race 150. Communicating with said T-bolt races, are T-bolts having miter gear nuts 151. Provision is made for the use of a wrench at 152 whereby said miter gear nuts may be adjusted. The work tables may be put on or taken off at any of the extensions or connections 39ᴮ. The work tables are provided with both dove tail and V form ways. The V form ways are provided on the extensions and connections as shown at 148. Thus provision is made whereby the feed tables holding work may be put on or taken off the feed circuit at either end or at any point between any two units.

With the machines assembled as a series of units to form a continuous system of multiple production of duplicate parts, various tools, cutters and attachments, to suit the work being done may be used. Milling cutters may be used as shown at 131ᶜ. Milling arbors may be driven by one spindle while the opposite spindle acts as an out-bearing. Or the arbor may be driven from both spindles at the same.

Vertical milling may be accomplished by cross rail vertical milling attachments as shown at 129ᶜ. Shaping may be done by the use of a tool head supported on the cylindrical projections as shown at 133ᶜ. Grinding wheels may be driven by high speed attachments as shown at 124ᶜ. Horizontal drilling may be accomplished on work held on the work tables or, in chucks held on the opposite work spindle. The drilling may be adjusted to any location on the work. Vertical drilling may be done by means of the vertical radial drilling attachment shown at 127ᶜ, the work may be held on the work table or on the floor at the side of the machine, or the work may be held in the chuck on the opposite spindle. Boring bars may be driven by one of the spindles while the opposite spindle acts as an out-bearing as shown at 128ᶜ. Thread chasing may be accomplished in a like manner on work held either on the work table or in a chuck held on the opposite spindle, the spindle being locked and acting as an out-bearing.

The system may be conveniently transformed back into individual units by disconnecting the extensions and connections 39ᴮ and the long cross feed screw 6ᴮ and replacing the short cross screws 37. Any unit may then be used as an individual lathe, milling machine, boring machine, grinding machine, shaper, planer, etc. Many operations may be performed simultaneously, and a plurality of machining operations may be performed without changing tools by placing the various tools, grinding wheels, and attachments on the table on opposite sides and in front of the work, the work spindles being reversed as desired by means of shift lever 71ᵃ. When feeding bar stock through the hollow work spindles using feeding chucks and turning collets, rapid production of screw machine products is accomplished.

I claim:

1. In a multiple use machine of the kind described, the combination of a bed, one or more saddles slidable on the bed, swivel supports on said saddles, vertically-adjustable heads mounted on said swivel supports, double ended work spindles mounted on said heads, a carriage also mounted on said bed, a cross slide on said carriage, a variable speed driving means on the bed, a power shaft extending lengthwise of the bed, means for rotating the spindles from said shaft, a reversible connection to said cross slide, a feed shaft extending lengthwise of the bed, means connecting it to the driving means, aprons on the saddles and the carriage, variable speed gearing in the aprons, means operated by the variable speed gearings for feeding the saddles and carriages on the bed and an independent connection from the gearing on the carriage to the cross slide for moving said cross slide.

2. In a multiple use machine of the kind described, the combination of a bed, one or more saddles slidable on the bed, swivel supports on said saddles, vertically adjustable heads mounted on said swivel supports, double ended spindles mounted on said heads, a carriage also mounted on said bed, a cross slide on said carriage, a variable speed driving means on the bed, a power shaft extending lengthwise of the bed, means for rotating the spindles from said shaft, a reversible connection to said cross slide, a feed shaft extending lengthwise of the bed, means connecting it to the driving means, aprons on the saddles and the carriage, variable speed gearing in said aprons, means operated by the variable speed gearings for feeding the saddles and carriages on the bed and an independent connection from the gearing on the carriage to the cross slide for moving said cross slide, means for reciprocating said saddles on the bed from gearing on the power shaft, racks on the cross slide and means for connecting said racks to gearing on the power shaft, a clutch on the power shaft, means for connecting said clutch to said reversible connection on the cross slide.

3. In a machine of the class described, a series of parallel beds, one or more saddles mounted on each bed, a swivel support on each saddle, a vertically adjustable head on each swivel support, a double ended tool spindle on each head, means for rotating the spindles, means for feeding the saddles on the beds, a transverse bed connecting said parallel beds, one or more cross slides on said transverse bed, a swivel work support mounted on the cross slides and means for moving said work supports on the transverse bed.

In testimony whereof I have affixed my signature.

ALDEN R. BREWER.